United States Patent
Lewis et al.

(10) Patent No.: US 12,477,002 B2
(45) Date of Patent: *Nov. 18, 2025

(54) CREDENTIAL-STUFFING ANOMALY DETECTION

(71) Applicant: Truist Bank, Charlotte, NC (US)

(72) Inventors: Michael Brantley Lewis, Nashville, NC (US); Jonathan Zeederberg, Clayton, NC (US); Jordan Berry, Charlotte, NC (US)

(73) Assignee: Truist Bank, Charlotte, NC (US)

( * ) Notice: Subject to any disclaimer, the term of this patent is extended or adjusted under 35 U.S.C. 154(b) by 112 days.

This patent is subject to a terminal disclaimer.

(21) Appl. No.: 18/498,446

(22) Filed: Oct. 31, 2023

(65) Prior Publication Data

US 2025/0139239 A1    May 1, 2025

Related U.S. Application Data

(63) Continuation of application No. 18/498,161, filed on Oct. 31, 2023.

(51) Int. Cl.
 H04L 9/40     (2022.01)
 G06F 21/31    (2013.01)
 G06F 21/55    (2013.01)

(52) U.S. Cl.
 CPC ......... *H04L 63/1466* (2013.01); *G06F 21/31* (2013.01); *G06F 21/554* (2013.01); *H04L 63/08* (2013.01); *H04L 63/083* (2013.01); *H04L 63/1416* (2013.01); *H04L 63/1441* (2013.01); *H04L 63/1491* (2013.01); *G06F 2221/034* (2013.01)

(58) Field of Classification Search
 CPC ............ G06F 21/316; H04L 2463/144; H04L 63/1425
 See application file for complete search history.

(56) References Cited

U.S. PATENT DOCUMENTS

| | | | |
|---|---|---|---|
| 10,505,991 B1* | 12/2019 | Yang | H04L 63/108 |
| 11,356,472 B1* | 6/2022 | Maiorana | H04L 63/1416 |
| 11,855,989 B1* | 12/2023 | Hall | H04L 63/101 |
| 2017/0134362 A1* | 5/2017 | Randall | H04L 63/083 |
| 2020/0112585 A1* | 4/2020 | Keohane | G06F 21/316 |
| 2020/0213334 A1* | 7/2020 | Kutner | H04L 63/1416 |
| 2021/0099451 A1* | 4/2021 | Will | H04L 63/0876 |
| 2022/0263834 A1* | 8/2022 | Cohen | H04L 63/0876 |
| 2023/0078849 A1* | 3/2023 | Seletskiy | H04L 63/101 726/23 |
| 2023/0179612 A1* | 6/2023 | Inon | H04L 63/083 726/23 |
| 2024/0073213 A1* | 2/2024 | Hadler | H04L 63/083 |

* cited by examiner

*Primary Examiner* — Beemnet W Dada
(74) *Attorney, Agent, or Firm* — Kilpatrick Townsend & Stockton LLP; Michael A. Springs, Esq.

(57) ABSTRACT

A computer-implemented method includes accessing data associated with log-in attempts of an interactive computing environment from attempt logs. The method further includes detecting a success percentage of log-in attempts by an entity. Additionally, the method includes identifying the entity as a credential-stuffing attacker based at least in part on the success percentage of log-in attempts by the entity. Moreover, the method includes restricting access to the interactive computing environment by the entity.

20 Claims, 3 Drawing Sheets

CREDENTIAL-STUFFING ANOMALY DETECTION

CROSS REFERENCE TO RELATED APPLICATIONS

The present application is a continuation of U.S. patent application Ser. No. 18/498,161, filed Oct. 31, 2023 and titled "CREDENTIAL-STUFFING ANOMALY DETECTION," which is incorporated herein by reference.

TECHNICAL FIELD

The present disclosure relates generally to anomaly detection and prevention and, more particularly (although not necessarily exclusively), to techniques for detecting and preventing credential-stuffing anomalies in interactive computing environments.

BACKGROUND

Various interactions are performed frequently through an interactive computing environment such as a website, a user interface, etc. Controlling access to the interactive computing environment is important to the security and performance of the environment. Access to the environment can be controlled through conventional means such as a username/password combination, multi-factor authentication, and the like. But the conventional means may not consider other factors about an entity that may indicate a credential-stuffing attack of the computing environment.

SUMMARY

In an example, a computing device includes a processor and a non-transitory computer-readable medium including instructions that are executable by the processor for causing the processor to access data associated with log-in attempts of an interactive computing environment from attempt logs. Additionally, the instructions are executable to cause the processor to detect a success percentage of log-in attempts by an entity and identify the entity as a credential-stuffing attacker based at least in part on the success percentage of log-in attempts by the entity. Further, the instructions are executable to cause the processor to restrict access to the interactive computing environment by the entity.

In an additional example, a computer implemented method includes accessing, by a processor, data associated with log-in attempts of an interactive computing environment from attempt logs. Additionally, the method includes detecting, by the processor, a success percentage of log-in attempts by an entity. Further, the method includes identifying, by the processor, the entity as a credential-stuffing attacker based at least in part on the success percentage of log-in attempts by the entity. Furthermore, the method includes restricting, by the processor, access to the interactive computing environment by the entity.

In an additional example, a non-transitory computer-readable medium may include instructions that are executable by a processing device for causing the processing device to access data associated with log-in attempts of an interactive computing environment from attempt logs. Additionally, the instructions are executable to cause the processing device to detect a success percentage of log-in attempts by an entity and identify the entity as a credential-stuffing attacker based at least in part on the success percentage of log-in attempts by the entity. Further, the instructions are executable to cause the processing device to restrict access to the interactive computing environment by the entity.

DETAILED DESCRIPTION

Certain aspects and examples of the present disclosure relate to detecting and preventing credential-stuffing anomalies in interactive computing environments. Credential-stuffing attacks may refer to automated systems that use stolen username and password pairs, otherwise referred to as user credentials, to gain access to interactive computing environments. The attacks may be performed using bots that are able to efficiently test stolen credentials against a large number of websites or other access-controlled interactive computing environments, often relying on individuals using the same credentials across a number of interactive computing environments.

To protect the interactive computing environments from such attacks, it may be beneficial for a detection system to detect credential-stuffing anomalies in data logs resulting from the credential-stuffing attacks. For example, the detection system may be able to distinguish valid traffic from invalid attacker traffic. In particular, the detection system may be capable of distinguishing valid bot traffic originating from aggregation platforms from the invalid bot traffic originating from an attacker. In other words, aggregation platforms may use valid bot traffic to obtain information aggregated into a single platform, such as a budgeting platform that pulls financial information from several computing environments, and the detection system described herein may distinguish such bot traffic of the aggregation platform from an invalid bot attack.

In an example, the detection system may source log-in attempts from logs internal to the interactive computing environments. From those logs, the detection system can determine that bot traffic originates from a credential-stuffing attacker based on log-in attempt success rates tracked from usernames and IP addresses that generate the attempts. If the detection system determines that a party is associated with the invalid attacker traffic, then the detection system can block that particular party to prevent further attack attempts for additional usernames.

Illustrative examples are given to introduce the reader to the general subject matter discussed herein and are not intended to limit the scope of the disclosed concepts. The following sections describe various additional features and examples with reference to the drawings in which like numerals indicate like elements, and directional descriptions are used to describe the illustrative aspects, but, like the illustrative aspects, should not be used to limit the present disclosure.

Figure 1:
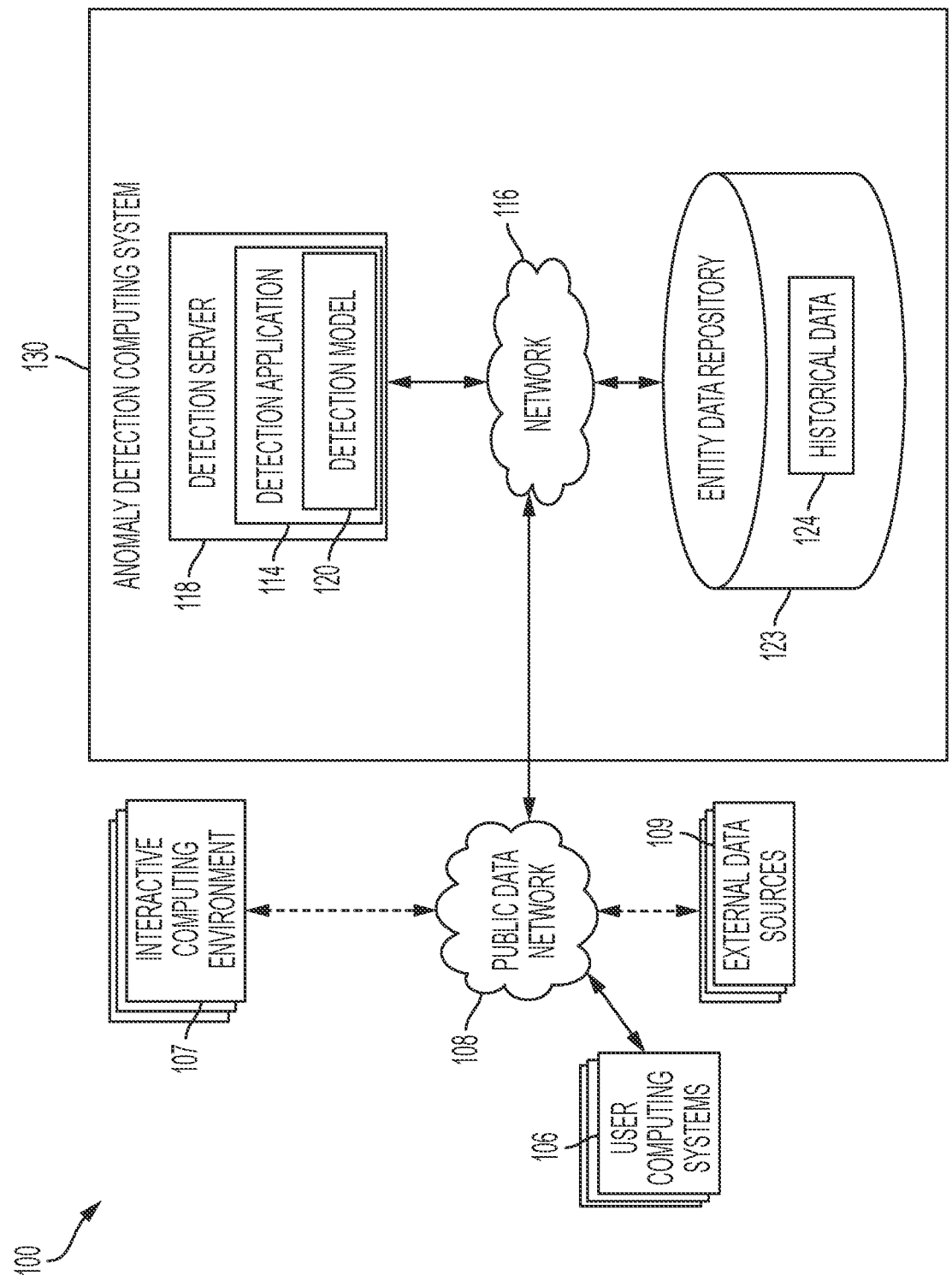
FIG. 1 is a block diagram depicting an example of a computing environment in which a credential-stuffing anomaly can be detected according to certain aspects of the present disclosure.

Referring now to the drawings, FIG. 1 is a block diagram illustrating an example of a computing environment 100 in which a credential-stuffing anomaly can be detected and used for determining credential-stuffing attacks according to certain aspects of the present disclosure. FIG. 1 illustrates examples of hardware components of an anomaly detection computing system 130 according to some aspects. The anomaly detection computing system 130 can be or include a specialized computing system that may be used for processing large amounts of data, such as for analyzing credential information for credential-stuffing anomalies, for controlling access to the interactive computing environment 107, etc., using a large number of computer processing cycles. The anomaly detection computing system 130 can include an anomaly detection server 118 for validating anomaly detection data from various sources. In some examples, the anomaly detection computing system 130 can include other suitable components, servers, subsystems, etc.

The anomaly detection server 118 can include one or more processing devices that can execute program code such as an anomaly detection application 114. The program code can be stored on a non-transitory computer-readable medium or other suitable medium. The anomaly detection server 118 can perform anomaly detection validation operations or access control operations for validating or otherwise authenticating (e.g., using other suitable modules, models, components, etc. of the anomaly detection server 118) received data such as credential data received from the user computing systems 106.

Entity data can be determined or otherwise received and can be stored in one or more network-attached storage units on which various repositories, databases, or other structures can be stored. The entity data can include real-time streamed data about an entity, real-time produced data about the entity, historical data, such as historical data 124, associated with the entity, etc. Examples of the data structures can include an entity data repository 123.

Network-attached storage units may store a variety of different types of data organized in a variety of different ways and from a variety of different sources. For example, the network-attached storage unit may include storage other than primary storage located within the anomaly detection server 118 that is accessible by processors located therein. In some aspects, the network-attached storage unit may include secondary, tertiary, or auxiliary storage, such as large hard drives, servers, and virtual memory, among other types of suitable storage. Storage devices may include portable or non-portable storage devices, optical storage devices, and various other mediums capable of storing and containing data. A machine-readable storage medium or computer-readable storage medium may include a non-transitory medium in which data can be stored and that does not include carrier waves or transitory electronic signals. Examples of a non-transitory medium may include a magnetic disk or tape, optical storage media such as a compact disk or digital versatile disk, flash memory, memory devices, or other suitable media.

Furthermore, the anomaly detection computing system 130 can communicate with various other computing systems. The other computing systems can include user computing systems 106 (e.g., smartphones, personal computers, etc.) and other suitable computing systems. For example, user computing systems 106 may send (e.g., in response to receiving input from the entity) requests for accessing the interactive computing environment 107 to the anomaly detection server 118.

As illustrated in FIG. 1, the anomaly detection computing system 130 may interact with the user computing systems 106 through one or more public data networks 108 to facilitate interactions between users of the user computing systems 106 and the interactive computing environment 107. For example, the anomaly detection computing system 130 can facilitate providing a user interface to the user computing system 106 for receiving various data from the user. The anomaly detection computing system 130 can validate anomaly detection data, for example inferences about the entity interacting with the interactive computing environment 107 to provide (or challenge, reject, otherwise control, etc.) access of the entity to the interactive computing environment 107, or to provide other suitable anomaly detections. In some examples, the anomaly detection computing system 130 can additionally communicate with third-party systems through the public data network 108 to receive additional anomaly detection or entity data, etc. For example, the third-party systems can provide real-time, or streamed, data about the entity, historical data about the entity, etc. to the anomaly detection computing system 130.

The anomaly detection computing system 130 can further include one or more processing devices that can be configured to provide an interactive computing environment 107, such as a user interface, etc., that can perform various operations. The interactive computing environment 107 can include executable instructions stored in one or more non-transitory computer-readable media. The instructions providing the interactive computing environment can configure one or more processing devices to perform the various operations. In some aspects, the executable instructions for the interactive computing environment can include instructions that provide one or more graphical interfaces. The graphical interfaces can be used by a user computing system 106 to access various functions of the interactive computing environment 107. For instance, the interactive computing environment 107 may transmit data to and receive data (e.g., via the graphical interface) from a user computing system 106 to shift between different states of the interactive computing environment 107, where the different states allow one or more electronics interactions between the user computing system 106 and a controlled-access computing system to be performed. A controlled-access computing system may include any computing system that requires user authentication with user credentials for access to the controlled-access computing system. The user credentials, in some examples, may include a username and a password.

In some examples, the anomaly detection computing system 130 may include other computing resources associated therewith, which may not be illustrated in FIG. 1, such as server computers hosting and managing virtual machine instances for providing cloud computing services, server computers hosting and managing online storage resources for users, server computers for providing database services, and others. The interaction between the user computing system 106 and the anomaly detection computing system 130 may be performed through graphical user interfaces (e.g., the user interface) presented by the anomaly detection computing system 130 or other suitable computing systems of the computing environment 100, or any suitable combination thereof. The graphical user interfaces can be presented to the user computing system 106. Application programming interface (API) calls, web service calls, or other suitable techniques can be used to facilitate interaction between the user computing system 106 and the anomaly detection computing system 130.

A user computing system 106 can include any computing device or other communication device operated by a user or entity such as a consumer or a customer. The user computing system 106 can include one or more computing devices such as laptops, smartphones, and other personal computing devices. A user computing system 106 can include executable instructions stored in one or more non-transitory computer-readable media. The user computing system 106 can additionally include one or more processing devices configured to execute program code to perform various operations. In various examples, the user computing system 106 can allow a user to access certain online services or other suitable products, services, or computing resources from a controlled-access computing system, to engage in mobile commerce or other interactions with the controlled-access computing system, to obtain controlled access to electronic content, such as the interactive computing environment 107.

The entity can use the user computing system 106 to engage in an electronic interaction with the controlled-access computing system via the interactive computing environment 107. The anomaly detection computing system 130 can receive a request, for example from the user computing system 106, to access the interactive computing environment 107 and can use data to determine whether to provide access, to challenge the request, to deny the request, etc. An electronic interaction between the user computing system 106 and the controlled-access computing system can include, for example, the user computing system 106 being used to request access to bank information, to request online computing resources, or other suitable services or products from the controlled-access computing system, etc.

In some aspects, an interactive computing environment 107 implemented through the controlled-access computing system can be used to provide access to various online functions. As a simplified example, a user interface or other interactive computing environment 107 provided by the controlled-access computing system can include electronic functions for requesting computing resources, online storage resources, network resources, database resources, or other types of resources. In another example, a website or other interactive computing environment 107 provided by the controlled-access computing system can include electronic functions for obtaining one or more financial services, such as an asset report, management tools, credit card application and transaction management workflows, electronic fund transfers, etc.

A user computing system 106 can be used to request access to the interactive computing environment 107 provided by the controlled-access computing system. The controlled-access computing system can submit a request, for example in response to a request made by the user computing system 106 to access the interactive computing environment 107, for anomaly detection to the anomaly detection computing system 130 and can selectively grant or deny access to various electronic functions based on anomaly detection performed by the anomaly detection computing system 130. Based on the request, the anomaly detection computing system 130 can generate an indication of whether the entity generating the request is invalid bot traffic.

In a simplified example, the system depicted in FIG. 1 can configure the anomaly detection server 118 to be used for controlling access to the interactive computing environment 107. The anomaly detection server 118 can receive data about an entity that submitted a request to access the interactive computing environment 107, for example, based on the information (e.g., collected by the controlled-access computing system via a user interface provided to the user computing system 106) provided by the controlled-access computing system or received via other suitable computing systems. In some examples, the anomaly detection server 118 can perform an evaluation of the information provided to the anomaly detection server 118. The evaluation may include determining a success percentage of log-in attempts by the entity. In some examples, the entity may be defined by a source IP address, and the success percentage may be based on the log-in attempts performed from the source IP address. The anomaly detection server 118 can also determine if the source IP address is located geographically at a location that is more likely to generate a credential-stuffing attack. The anomaly detection server 118 may transmit the success percentages and the geographical location information, or other suitable inferences associated with the entity, to the controlled-access computing system for use in controlling access to the interactive computing environment 107 or for other suitable anomaly detection purposes.

In some examples, the inference determined therefrom can be used, for example, by the anomaly detection computing system 130, the controlled-access computing system, etc., to determine whether the risk associated with the entity accessing a service provided by the controlled-access computing system exceeds a threshold, thereby granting, challenging, or denying access by the entity to the interactive computing environment 107. For example, if the anomaly detection computing system 130 determines that the inferences indicate that the entity is a valid bot, then the controlled-access computing system associated with the service provider can generate or otherwise provide access permission to the user computing system 106 that requested the access. In other examples, the anomaly detection computing system 130 can challenge or deny the access attempt if the anomaly detection computing system 130 determines that the entity is likely an invalid bot performing a credential-stuffing attack.

Each communication within the computing environment 100 may occur over one or more data networks, such as a public data network 108, a network 116 such as a private data network, or some combination thereof. A data network may include one or more of a variety of different types of networks, including a wireless network, a wired network, or a combination of a wired and wireless network. Examples of suitable networks include the Internet, a personal area network, a local area network ("LAN"), a wide area network ("WAN"), or a wireless local area network ("WLAN"). A wireless network may include a wireless interface or a combination of wireless interfaces. A wired network may include a wired interface. The wired or wireless networks may be implemented using routers, access points, bridges, gateways, or the like, to connect devices in the data network.

The number of devices illustrated in FIG. 1 is provided for illustrative purposes. Different numbers of devices may be used. For example, while certain devices or systems are illustrated as single devices in FIG. 1, multiple devices may instead be used to implement these devices or systems. Similarly, devices or systems that are shown as separate, such as the anomaly detection server 118 and the entity data repository 123, may be instead implemented in a single device or system. Similarly, and as discussed above, the anomaly detection computing system 130 may be included in the controlled-access computing system.

Figure 2:
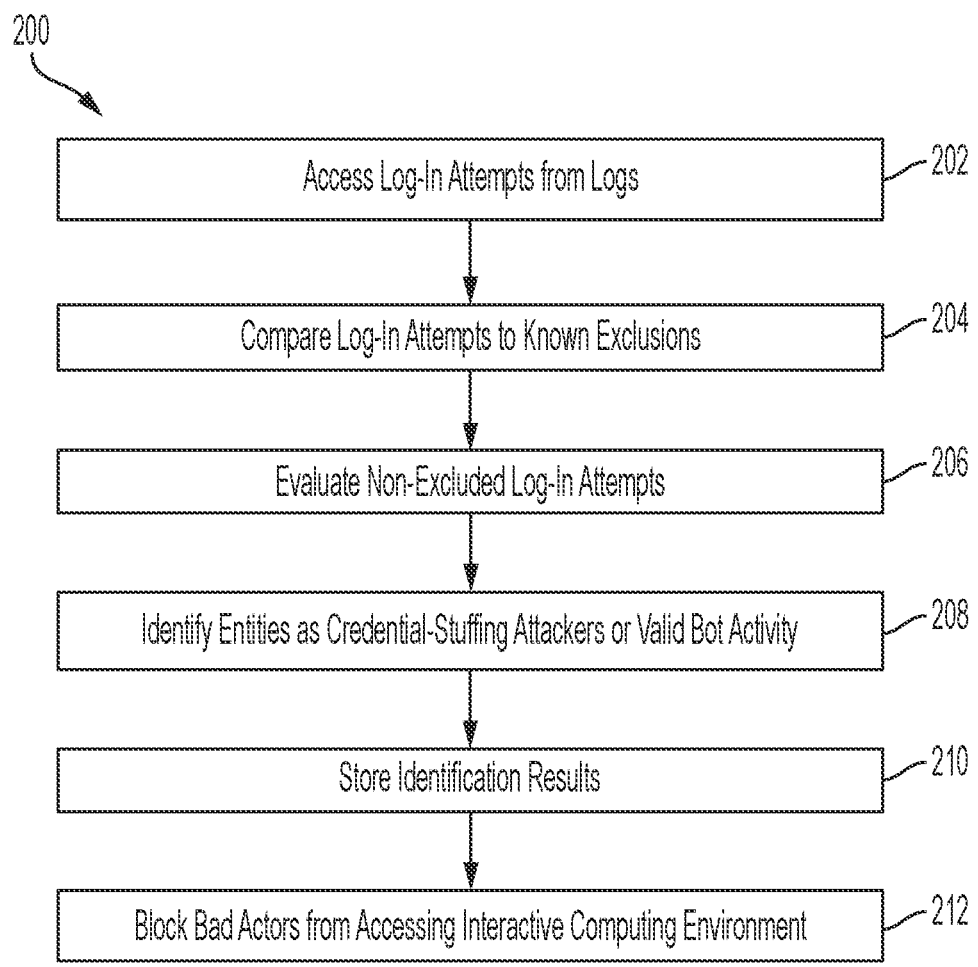
FIG. 2 is a flowchart depicting an example of a process for detecting a credential-stuffing anomaly according to certain aspects of the present disclosure.

FIG. 2 is a flowchart of an example process 200 for detecting a credential-stuffing anomaly according to certain aspects of the present disclosure. Some examples may include more steps, fewer steps, different steps, or a different combination of steps than the blocks shown in FIG. 2. The blocks of FIG. 2 are described below with reference to the components of FIG. 1 described above.

At block 202, the process 200 may involve accessing log-in attempts from logs associated with the interactive computing environment 107. The logs may include information about usernames attempted, successful log-in attempts, unsuccessful log-in attempts, source IP addresses associated with the log-in attempts, geographical locations of the source IP addresses, or any other information usable by the anomaly detection computing system 130 for detecting credential-stuffing anomalies associated with the log-in attempts.

At block 204, the process 200 may involve comparing log-in attempts to known exclusions. To minimize or otherwise reduce a computing burden on detecting the credential-stuffing anomalies, the log-in attempts that are known to be from legitimate entity sources can be removed from further processing. For example, the anomaly detection computing system 130 may maintain an "allow list" of known entities where further analysis is not needed. Such a list may include entities that were previously vetted by the process 200 and found to be valid, or entities that are otherwise known to be valid originators of log-in attempts.

At block 206, the process 200 may involve evaluating non-excluded log-in attempts. The anomaly detection computing system 130 may evaluate success percentages of log-in attempts. In an example, a successful log-in attempt may include a correct username and password combination. An unsuccessful log-in attempt may include an incorrect username or an incorrect password for a correct username. The success percentages may be calculated per source IP address of an entity generating the log-in attempts as a percentage of successful log-in attempts out of the total number of log-in attempts. An additional success percentage may be tied to a particular username. For example, a percentage of successful log-in attempts may also be tracked for an individual username in addition to an entity level tracking. Further, the anomaly detection computing system 130 may track a number of usernames attempted by an individual entity. Additionally, the anomaly detection computing system 130 may track geographical locations of the entity generating the log-in attempts.

At block 208 the process 200 involves identifying entities as credential-stuffing attackers or valid bot activity. The entities may be identified based on the evaluations performed by the anomaly detection computing system 130 at block 206. For example, a low log-in success percentage (e.g., for an individual username or for an entity associated with a source IP address), a large number of usernames attempted for a single entity, a geographical location of the entity, or a combination thereof, may all contribute to identifying an entity as a credential-stuffing attacker.

In some examples, a success percentage may be a starting point for identifying whether the entity is a credential-stuffing attacker or valid bot activity. For example, a success percentage threshold may be established. In some examples, that percentage may be 95%, but other percentages may also be used. In such an example, the success percentage may be high enough to ensure that an entity exceeding the number is very likely performing valid bot activity while also low enough to account for the possibility that a password associated with a username may have changed for valid reasons. An entity operating as an aggregation platform, such as a web-based budget tracking platform that aggregates financial information from disparate sources, may perform a large number of log-in attempts in short succession to acquire information from a source. This valid bot traffic likely includes a high log-in success percentage because the individual users have provided the aggregator platform with the valid credential information. Accordingly, the high success percentage may indicate that the entity is performing valid bot activity. Likewise, a lower success percentage may be evidence that the entity is performing credential-stuffing attacks.

If the success percentage falls below the threshold, then the anomaly detection computing system 130 may look to additional reference values to determine if the entity is performing a credential-stuffing attack. For example, the anomaly detection computing system 130 may detect a large number of log-in attempts on a number of disparate usernames as further evidence of a credential-stuffing attack. Additionally, the anomaly detection computing system 130 may identify geographical locations of the entity, where some locations (e.g., locations located outside of the United States) may be more likely to be the source of a credential-stuffing attack. Further, in some examples, the threshold success percentages may slide based on the additional reference values. For example, the success percentage threshold may increase when the entity is determined to be outside the United States (e.g., from 95% to 97% or greater) to indicate that the entity is performing valid bot activity. Similarly, the success percentage threshold may increase when the entity attempts log-ins from more user accounts. For example, a single log-in attempt for a single username or account is very unlikely to be a credential-stuffing attack, but a large number of log-in attempts from a large number of usernames or accounts is much more likely to be indicative of a credential-stuffing attack. Thus, the success percentage threshold may increase when the entity performs log-in attempts for a large number of usernames.

At block 210, the process 200 involves storing the identification results. In an example, the anomaly detection computing system 130 may store indications of whether an entity is valid or invalid in the entity data repository 123 based on the identification performed at block 208. In some examples, storing the entity data as a valid entity may place that entity on the known exclusions list for consultation during subsequent performances of the process 200.

At block 212, the process 200 involves blocking bad actors from accessing the interactive computing environment 107. In an example, the anomaly detection computing system 130 may prevent an entity that is determined to be performing a credential-stuffing attack from accessing protected portions of the interactive computing environment regardless of whether the entity had correct credentials for the anomaly detection computing system 130.

Example of Computing System

Figure 3:
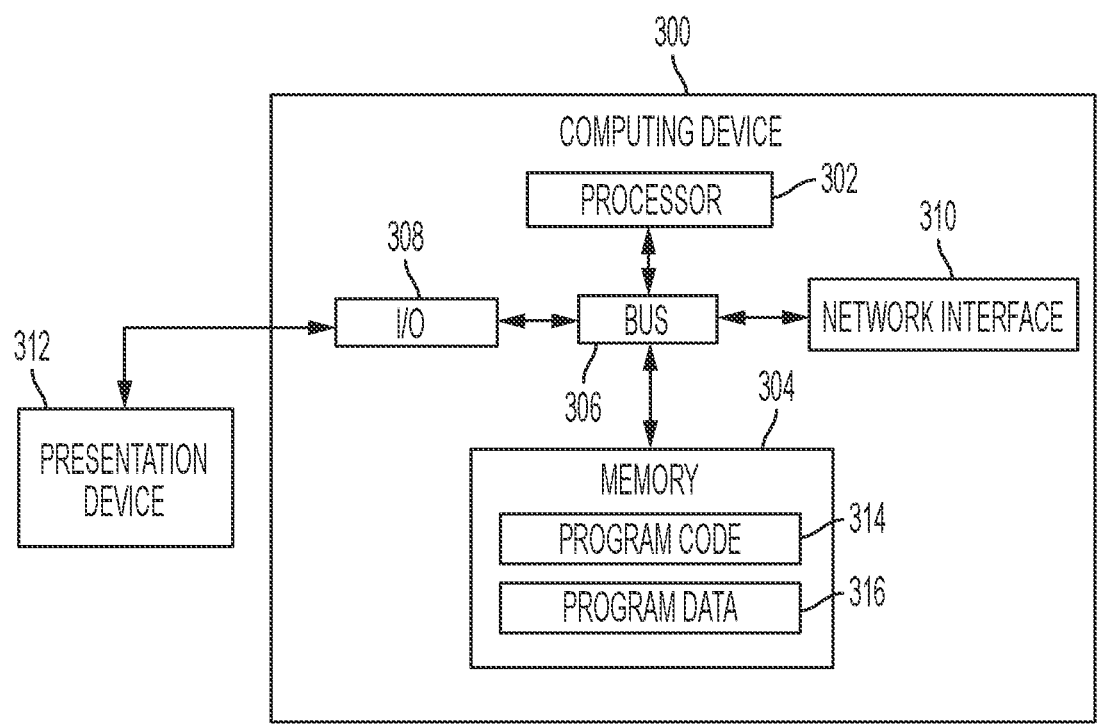
FIG. 3 is a block diagram depicting an example of a computing system suitable for implementing aspects of the techniques and technologies presented herein.

Any suitable computing system or group of computing systems can be used to perform the operations for the credential-stuffing anomaly detection operations described herein. For example, FIG. 3 is a block diagram illustrating an example of a computing device 300, which can be used to implement the anomaly detection server 118 or other suitable components of the computing environment 100. The computing device 300 can include various devices for communicating with other devices in the computing environment 100, as described with respect to FIG. 1. The computing device 300 can include various devices for performing one or more operations described above with respect to FIGS. 1-2.

The computing device 300 can include a processor 302 that is communicatively coupled to a memory 304. The processor 302 can execute computer-executable program code stored in the memory 304, can access information stored in the memory 304, or both. Program code may include machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing or receiving information, data, arguments, parameters, or memory contents. Information, arguments, parameters, data, etc., may be passed, forwarded, or transmitted via any suitable means including memory sharing, message passing, token passing, network transmission, among others.

Examples of a processor 302 can include a microprocessor, an application-specific integrated circuit (ASIC), a field-programmable gate array (FPGA), or any other suitable processing device. The processor 302 can include any suitable number of processing devices, including one. The processor 302 can include or communicate with a memory 304. The memory 304 can store program code that, when executed by the processor 302, causes the processor 302 to perform the operations described herein.

The memory 304 can include any suitable non-transitory computer-readable medium. The computer-readable medium can include any electronic, optical, magnetic, or other storage device capable of providing a processor with computer-readable program code or other program code. Non-limiting examples of a computer-readable medium can include a magnetic disk, memory chip, optical storage, flash memory, storage class memory, ROM, RAM, an ASIC, magnetic storage, or any other medium from which a computer processor can read and execute program code. The program code may include processor-specific program code generated by a compiler or an interpreter from code written in any suitable computer-programming language. Examples of suitable programming language can include Hadoop, C, C++, C#, Visual Basic, Java, Python, Perl, JavaScript, ActionScript, etc.

The computing device 300 may also include a number of external or internal devices such as input or output devices. For example, the computing device 300 is illustrated with an input/output interface 308 that can receive input from input devices or provide output to output devices. A bus 306 can also be included in the computing device 300. The bus 306 can communicatively couple one or more components of the computing device 300.

The computing device 300 can execute program code 314 that can include the anomaly detection application 114. The program code 314 for the anomaly detection application 114 may be resident in any suitable computer-readable medium and may be executed on any suitable processing device. For example, as depicted in FIG. 3, the program code 314 for the anomaly detection application 114 can reside in the memory 304 at the computing device 300 along with the program data 316 associated with the program code 314, such as the historical data 124. Executing the anomaly detection application 114 can configure the processor 302 to perform at least some of the operations described herein.

In some aspects, the computing device 300 can include one or more output devices. One example of an output device can be the network interface device 310 depicted in FIG. 3. A network interface device 310 can include any device or group of devices suitable for establishing a wired or wireless data connection to one or more data networks described herein. Non-limiting examples of the network interface device 310 can include an Ethernet network adapter, a modem, etc.

Another example of an output device can include the presentation device 312 depicted in FIG. 3. A presentation device 312 can include any device or group of devices suitable for providing visual, auditory, or other suitable sensory output. Non-limiting examples of the presentation device 312 can include a touchscreen, a monitor, a speaker, a separate mobile computing device, etc. In some aspects, the presentation device 312 can include a remote client-computing device that communicates with the computing device 300 using one or more data networks described herein. In other aspects, the presentation device 312 can be omitted.

The foregoing description of certain examples, including illustrated examples, has been presented only for the purpose of illustration and description and is not intended to be exhaustive or to limit the disclosure to the precise forms disclosed. Numerous modifications, adaptations, and uses thereof will be apparent to those skilled in the art without departing from the scope of the disclosure.

What is claimed is:

1. A computing device comprising:
a processor; and
a non-transitory computer-readable medium comprising instructions that are executable by the processor to cause the processor to:
access data associated with log-in attempts of an interactive computing environment from attempt logs;
identify known entities from the data associated with the log-in attempts;
remove data associated with the known entities from the data associated with the log-in attempts to generate a set of scrutinized log-in attempts of a first entity and a second entity;
detect a first success percentage of a first subset of the set of scrutinized log-in attempts by the first entity;
detect a second success percentage of a second subset of the set of scrutinized log-in attempts by the second entity;
identify the first entity as a credential-stuffing attacker based at least in part on the first success percentage of the first subset of the set of scrutinized log-in attempts by the first entity not exceeding a first threshold associated with a first geographical location of the first subset of the set of scrutinized log-in attempts;
identify the second entity as performing legitimate bot activities based at least in part on the second success percentage of the set of scrutinized log-in attempts by the second entity exceeding a second threshold associated with a second geographical location of the second subset of the set of scrutinized log-in attempts, wherein the first threshold is lower than the second threshold; and
restrict access to the interactive computing environment by the first entity.

2. The computing device of claim 1, wherein the non-transitory computer-readable medium further comprises instructions that are executable by the processor to cause the processor to:
allow access to the interactive computing environment by the second entity.

3. The computing device of claim 1, wherein identifying the known entities comprises comparing the log-in attempts against a known exclusions list to determine that the data associated with the known entities is excludable from the set of scrutinized log-in attempts.

4. The computing device of claim 1, wherein the non-transitory computer-readable medium further comprises instructions that are executable by the processor to cause the processor to:
determine a number of usernames attempted by the first entity in the set of scrutinized log-in attempts; and determine the first geographical location of the first entity during the set of scrutinized log-in attempts, wherein identifying the first entity as the credential-stuffing attacker is further based on the number of usernames attempted and the first geographical location of the first entity.

5. The computing device of claim 4, wherein using the first success percentage of the first subset of the set of scrutinized log-in attempts of the first entity to identify the first entity as the credential-stuffing attacker comprises using a sliding-threshold success percentage, and wherein a threshold success percentage of the sliding-threshold success percentage is adjusted using the number of usernames attempted and the first geographical location of the first entity.

6. The computing device of claim 1, wherein using the first success percentage of the first subset of the set of scrutinized log-in attempts of the first entity to identify the first entity as the credential-stuffing attacker comprises determining that the first success percentage is 95 percent when the attempts originate in a first country or is 97 percent when the attempts originate in a second country.

7. The computing device of claim 1, wherein identifying the credential-stuffing attacker comprises identifying that the first entity is performing invalid bot traffic.

8. A computer-implemented method comprising:
accessing, by a processor, data associated with log-in attempts of an interactive computing environment from attempt logs;
identifying, by the processor, known entities from the data associated with the log-in attempts;
removing, by the processor, data associated with the known entities from the data associated with the log-in attempts to generate a set of scrutinized log-in attempts of a first entity and a second entity;
detecting, by the processor, a first success percentage of a first subset of the set of scrutinized log-in attempts by the first entity;
detecting, by the processor, a second success percentage of a second subset of the set of scrutinized log-in attempts by the second entity;
identifying, by the processor, the first entity as a credential-stuffing attacker based at least in part on the first success percentage of the first subset of the set of log-in attempts by the first entity not exceeding a first threshold associated with a first geographical location of the first subset of the set of scrutinized log-in attempts;
identifying, by the processor, the second entity as performing legitimate bot activities based at least in part on the second success percentage of the set of scrutinized log-in attempts by the second entity exceeding a second threshold associated with a second geographical location of the second subset of the set of scrutinized log-in attempts, wherein the first threshold is lower than the second threshold; and
restricting, by the processor, access to the interactive computing environment by the first entity.

9. The computer-implemented method of claim 8, further comprising:
allowing, by the processor, access to the interactive computing environment by the second entity.

10. The computer-implemented method of claim 8, wherein identifying the known entities comprises comparing the log-in attempts against a known exclusions list to determine that the data associated with the known entities is excludable from the set of scrutinized log-in attempts.

11. The computer-implemented method of claim 8, further comprising:
determining, by the processor, a number of usernames attempted by the first entity in the first subset of the set of scrutinized log-in attempts; and
determining, by the processor, the geographical location of the first entity during the first subset of the set of scrutinized log-in attempts, wherein identifying the first entity as the credential-stuffing attacker is further based on the number of usernames attempted and the first geographical location of the first entity.

12. The computer-implemented method of claim 11, wherein using the first success percentage of the first subset of the set of scrutinized log-in attempts of the first entity to identify the first entity as the credential-stuffing attacker comprises using a sliding-threshold success percentage, and wherein a threshold success percentage of the sliding-threshold success percentage is adjusted using the number of usernames attempted and the first geographical location of the first entity.

13. The computer-implemented method of claim 8, wherein using the first success percentage of the first subset of the set of scrutinized log-in attempts of the first entity to identify the first entity as the credential-stuffing attacker comprises determining that the first success percentage is 95 percent when the attempts originate in a first country or is 97 percent when the attempts originate in a second country.

14. The computer-implemented method of claim 8, wherein identifying the credential-stuffing attacker comprises identifying that the first entity is performing invalid bot traffic.

15. A non-transitory computer-readable medium comprising instructions that are executable by a processing device for causing the processing device to:
access data associated with log-in attempts of an interactive computing environment from attempt logs;
identify known entities from the data associated with the log-in attempts;
remove data associated with the known entities from the data associated with the log-in attempts to generate a set of scrutinized log-in attempts of a first entity and a second entity;
detect a first success percentage of a first subset of the set of scrutinized log-in attempts by the first entity;
detect a second success percentage of a second subset of the set of scrutinized log-in attempts by the second entity;
identify the first entity as a credential-stuffing attacker based at least in part on the first success percentage of the first subset of the set of scrutinized log-in attempts by the first entity not exceeding a first threshold associated with a first geographical location of the first subset of the set of scrutinized log-in attempts;
identify the second entity as performing legitimate bot activities based at least in part on the second success percentage of the set of scrutinized log-in attempts by the second entity exceeding a second threshold associated with a second geographical location of the second subset of the set of scrutinized log-in attempts, wherein the first threshold is lower than the second threshold; and
restrict access to the interactive computing environment by the first entity.

16. The non-transitory computer-readable medium of claim 15, further comprising instructions that are executable by the processing device to cause the processing device to:

allow access to the interactive computing environment by the second entity.

17. The non-transitory computer-readable medium of claim 15, wherein identifying the known entities comprises comparing the log-in attempts against a known exclusions list to determine that the data associated with the known entities is excludable from the set of scrutinized log-in attempts.

18. The non-transitory computer-readable medium of claim 15, further comprising instructions that are executable by the processing device to:
   determine a number of usernames attempted by the first entity in the first subset of the set of scrutinized log-in attempts; and
   determine the geographical location of the first entity during the first subset of the set of scrutinized log-in attempts, wherein identifying the first entity as the credential-stuffing attacker is further based on the number of usernames attempted and the first geographical location of the first entity.

19. The non-transitory computer-readable medium of claim 18, wherein using the first success percentage of the first subset of the set of scrutinized log-in attempts of the first entity to identify the first entity as the credential-stuffing attacker comprises using a sliding-threshold success percentage, and wherein a threshold success percentage of the sliding-threshold success percentage is adjusted using the number of usernames attempted and the first geographical location of the first entity.

20. The non-transitory computer-readable medium of claim 15, wherein identifying the credential-stuffing attacker comprises identifying that the first entity is performing invalid bot traffic.

* * * * *